May 8, 1923.
F. A. WERNIG
AUTOMOBILE BUMPER
Filed July 16, 1921
1,454,360
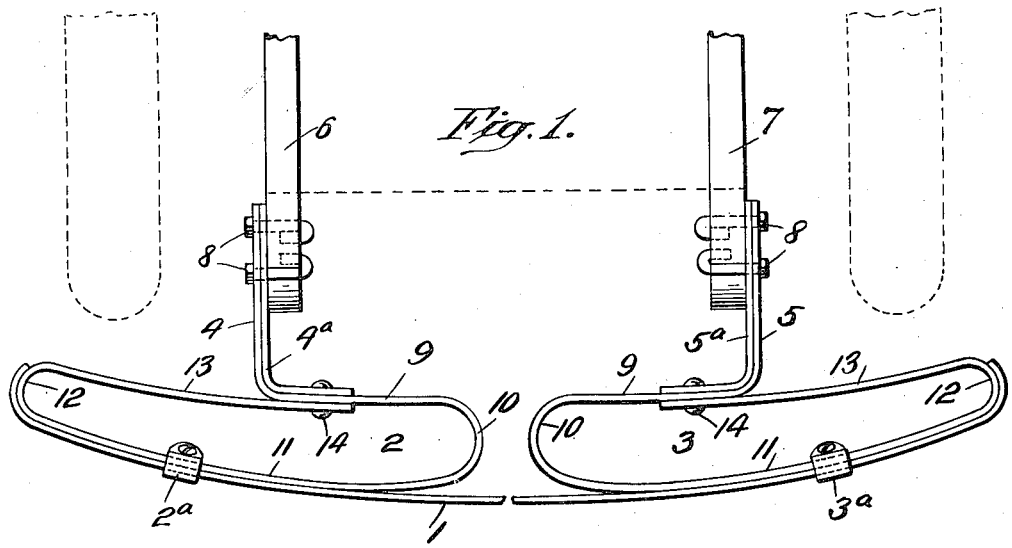
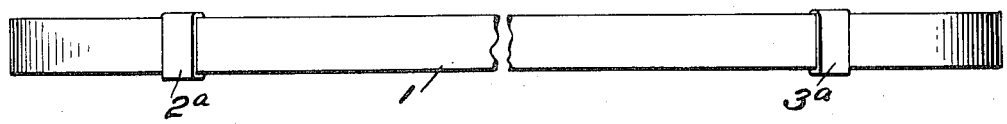
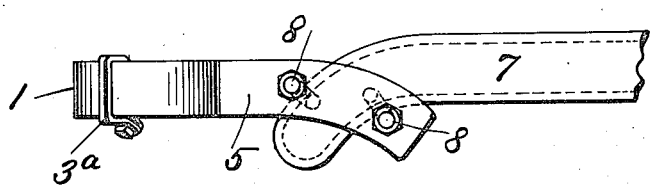
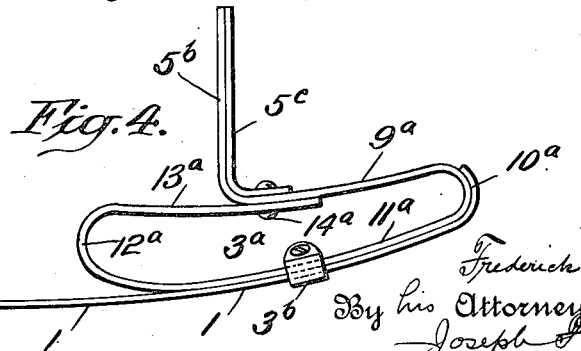
Inventor
Frederick A. Wernig
By his Attorney
Joseph F. O'Brien Patented May 8, 1923.

1,454,360

UNITED STATES PATENT OFFICE.

FREDERICK A. WERNIG, OF BROOKLYN, NEW YORK.

AUTOMOBILE BUMPER.

Application filed July 16, 1921. Serial No. 485,358.

*To all whom it may concern:*

Be it known that I, FREDERICK A. WERNIG, a citizen of the United States, and a resident of borough of Brooklyn, county of Kings, and State of New York, have invented certain new and useful Improvements in Automobile Bumpers, of which the following is a specification.

This invention relates to improvements in automobile bumpers.

One of the objects of this invention is to produce an automobile bumper which will be composed of a minimum number of parts and may be manufactured at a low cost.

Another object of my invention is to produce an automobile bumper which will have the advantages of the sensitive and effective action of the ordinary elliptical spring without the large cost thereof.

Another object of my invention is to produce a bumper having an impact member composed of a strip of spring steel and means for supporting the same including a pair of elliptical springs, each formed of a single strip of spring metal, whereby I am enabled to produce a bumper which will with equal effectiveness cushion shocks of varying intensities and which will transmit such shocks over all the parts and will have a maximum of resilience and resistance to permanent deformation.

Another object of my invention is to produce a bumper embodying a pair of cylindrical springs each having an attaching arm formed integrally therewith, and each attaching arm preferably being reinforced by a reinforcing arm or member.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan or top view of a bumper embodying my invention;

Fig. 2 is a front view of the bumper shown in Fig. 1;

Fig. 3 is a side view of said bumper; and

Fig. 4 is a plan of a bumper embodying a modified form of my invention.

Referring now to Figs. 1, 2 and 3 of these drawings, 1 indicates an impact bar which, as shown, is preferably formed of a single strip of spring metal and extends transversely across the body of the automobile to opposite sides of the wheels. This impact bar in the embodiment shown is forwardly bowed and is supported by supporting members including a pair of springs 2 and 3, respectively, substantially elliptical in conformation and disposed in opposite directions so as to extend transversely of the wheels and sills of the car body. Said elliptical springs are also preferably formed of a single strip of spring metal of a width similar to that of the impact bar.

As illustrated, the springs 2 and 3 also preferably have integrally formed therewith connecting arms 4 and 5 which are secured to the sills 6 and 7 of the automobile chassis, and each of the said elliptical springs preferably have a starting leg 9 extending laterally and inwardly from its connecting arm toward the midplane of the car body; a loop or arc 10 which causes the spring to contact with the impact bar 1; an abutting leg 11 preferably extending in contact with the impact bar to the outer end thereof and is at said end provided with a return loop 12 and a terminal leg 13 which terminates in contact with the starting leg 9 thereof. This terminal leg 13 is preferably provided with a slot and preferably has a slot and pin connection with the initial leg by a rivet 14.

As illustrated, the arms 4 and 5 are fastened to the sills by bolts 8, and the pair of elliptical springs are fastened to the impact bar, as illustrated, by straps 2ª and 3ª.

Each of the integral spring arms is preferably reinforced by reinforcing bars 4ª, 5ª which extend forwardly and preferably are bent into conformity with the said integral connecting bars so as to reinforce and assist in taking up the strain upon such arms.

In the modified form of construction shown in Fig. 4, the starting leg 9ª of the loop 3ª extends outwardly from the connecting arm toward the outer end of the impact bar and a loop 10ª causes the spring to contact at said outer end with the impact bar 1 and to have an abutting leg 11ª which preferably extends inwardly to a point at the opposite side of the attaching portion where a loop 12ª is formed and a terminal leg 13ª extends beyond the starting leg 9ª, and abuts against the same and is fastened thereto by a rivet 14ª which preferably has a slot and pin connection therewith. In this modified construction the attaching member 5ᵇ is also preferably formed integral with the spring and this attaching member is reinforced by a reinforcing member 5ᶜ and the abutting portion 11ᵃ is fastened to the impact bar 1 by straps 3ᵇ.

In other respects the construction is the same as that illustrated in Figs. 1, 2 and 3.

Having described my invention, I claim:—

1. An automobile bumper embodying an impact bar extending transversely across the front of the machine and supporting members for opposite ends of said bar including a pair of springs substantially elliptical in conformation fastened to said bumper bar, each spring being composed of a single strip of spring metal and having two oppositely disposed loops and connecting leg portions between such loops, one of which leg portions abuts against the other and is disposed in substantial parallelism thereto, and means for fastening said elliptical springs to the automobile frame.

2. An automobile bumper embodying an impact bar extending transversely across the front of the machine and supporting members for opposite ends of said bar including a pair of springs substantially elliptical in conformation fastened to said bumper bar, each composed of a single strip of spring metal and having two oppositely disposed loops connected by substantially parallel leg portions and having a terminal portion abutting against a starting portion, and a spring attaching arm formed integrally with said elliptical spring for fastening the same to the automobile frame.

3. An automobile bumper embodying an impact bar extending transversely across the front of the machine and supporting members for opposite ends of said bar including a pair of springs substantially elliptical in conformation fastened to said bumper bar, each composed of a single strip of spring metal, a spring arm integrally formed with said elliptical spring for fastening the same to the automobile frame and a reinforcing arm substantially conforming in contour with said integral arm.

4. An automobile bumper embodying an impact bar extending transversely across the front of the machine and supporting members for opposite ends of said bar including a pair of springs substantially elliptical in conformation fastened to said bumper bar, each spring being composed of a single strip of spring metal and having two oppositely disposed loops and a terminal leg abutting against its starting leg, and a slot and pin connection between said abutting legs.

5. An automobile bumper embodying an impact bar extending transversely across the front of the machine and supporting members for opposite ends of said bar including a pair of springs substantially elliptical in conformation fastened to said bumper bar, each spring being composed of a single strip of spring metal having a starting leg extending toward the midplane of the car and spaced from the impact bar, outwardly-disposed loop portions, a portion abutting against the impact bar extending to the end thereof, another loop portion disposed inwardly and a terminal leg abutting against the starting leg.

6. An automobile bumper embodying an impact bar extending transversely across the front of the machine and supporting members for opposite ends of said bar including a pair of springs substantially elliptical in conformation fastened to said bumper bar, each spring being composed of a single strip of spring metal having a starting leg extending toward the midplane of the car and spaced from the impact bar, outwardly-disposed loop portions, a portion abutting against the impact bar extending to the end thereof, another loop portion disposed inwardly and a terminal leg abutting against the starting leg and a slot and pin connection between said terminal and starting legs.

In witness whereof, I have signed my name to the foregoing specification in the presence of two subscribing witnesses.

FREDERICK A. WERNIG.

Witnesses:
HELEN V. WHIDDEN,
JULIUS M. LUTZ.